March 26, 1929.    H. MORAN    1,706,738
POWER TRANSMISSION MECHANISM COMPRISING VARIABLE SPEED GEARING
Filed Dec. 31, 1926
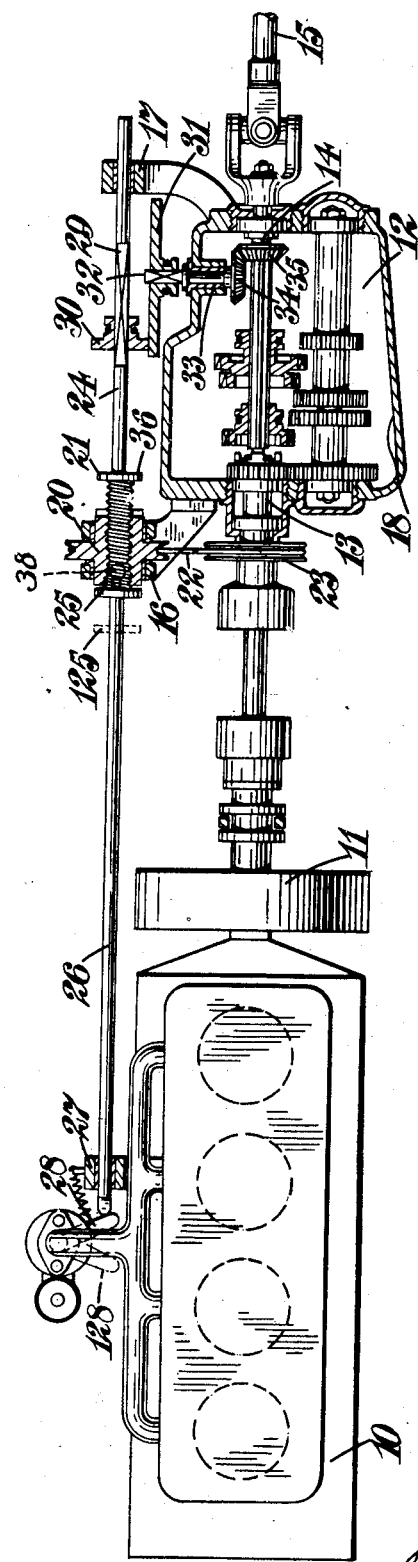
Inventor:
Henry Moran,
By Byrnes, Stebbins & Parmelee
attys.

Patented Mar. 26, 1929.

1,706,738

UNITED STATES PATENT OFFICE.

HENRY MORAN, OF BARNES COMMON, LONDON, ENGLAND.

POWER-TRANSMISSION MECHANISM COMPRISING VARIABLE-SPEED GEARING.

Application filed December 31, 1926, Serial No. 158,257, and in Great Britain January 16, 1926.

This invention relates to power-transmission mechanism comprising an engine, a change-speed gear driven thereby, and a driven shaft driven by said gear, particularly such as is used on motor-driven vehicles, although the invention is not restricted to such vehicles, as it is applicable to the power-transmission mechanism of motor boats, cranes and the like.

The invention has for its object to facilitate gear changing and to prevent injury of the change-speed gear by providing that when it is desired to change to a different gear ratio, either higher or lower, the engine speed shall be adjusted before changing the gear to that which is required with the new gear ratio in operation.

According to an important feature of the invention there is provided power-transmission mechanism comprising an engine, a change-speed gear driven thereby and a driven shaft driven by said gear, in combination with a differential mechanism comprising two elements movable each relatively to the other, and operatively connected respectively with the engine and driven shafts of the change-speed gear, control means adjustable at will for adjusting the differential operation (for example movement) of said elements selectively to a ratio equal to a desired gear ratio of the change-speed gear, and adjusting means actuated by the differential operation (for example movement) of said elements and so arranged to operate a control member (for example a throttle valve) of the engine as to adjust the engine speed relatively to the speed of the driven shaft so that their ratio is equal to the gear ratio to which the control means is set.

This construction enables that before a new gear ratio of the change-speed gear is brought into operation, the speed of the driving shaft of the gear may be so adjusted in relation to the speed of the driven shaft thereof that the same is correct for the required new gear ratio, whereby the change can be effected readily and without risk of injury to the wheels of the gear.

According to another feature of the invention the control means aforesaid in the form of variable transmission gear (for example variable friction gear) is provided in or constitutes one of the operative connections of said elements to its driving shaft.

According to a further feature of the invention the differential mechanism is in the form of two elements screw-threaded one on the other (for example a nut screwed on a spindle), whereof one (for example the nut) is held against endwise movement in relation to the second, the endwise movement of which second element in relation to the first is imparted to the control-member of the engine.

Other features of the invention will be described hereinafter and pointed out in the claims.

The invention is illustrated diagrammatically and by way of example in the accompanying drawing in a diagrammatic plan view, partly in horizontal section, showing one form of power-transmission mechanism according to the invention.

Referring to the drawing, a motor vehicle is provided, as usual, with power-transmission mechanism comprising an internal-combustion engine 10, a clutch 11 driven thereby, and a change-speed gear 12 for three speeds and reverse having its driving shaft 13 coupled with the clutch 11, and having its driven shaft 14 arranged to drive a propeller shaft 15 for driving the rear axle. Two co-axial bearings 16, 17 lying in a direction parallel with the power-transmission mechanism aforesaid are provided on the outside of the gear box 18 one at each end thereof.

A differential mechanism comprises two elements 20, 21 whereof one is in the form of a nut 20 journalled in said bearing 16 and held thereby against endwise movement. This nut carries or is integral with a pulley which is coupled by a belt 22 or the like with a driving pulley 23 fast on the driving shaft 13 of the change-speed gear at the engine side of the gear box. The second element of the differential mechanism is in the form of a screw-threaded portion 21 of a spindle 24 received by said nut and extending beyond both ends of the same. The end of the element 21 nearer the engine carries a collar 25 fixed on it, and also is operatively connected to one end of an operating rod 26 extending towards the engine, the other end of which rod 26 is slidable endwise in a bearing 27 mounted on the engine frame adjacent the induction pipe of the engine. A lever 28 connected to the engine throttle valve bears against the adjacent end of said operating rod and is held against it by the usual spring which tends to close the throttle. The rod 26 does not prevent the throttle from being opened by the usual control at all times, but during the operation of gear changing it pushes the throttle open against the action of its spring. When the gear change has been effected the operation of the throttle is entirely normal and the described differential mechanism is out of action. Conveniently, this rod 26 which constitutes one form of adjusting means aforesaid, is connected to the spindle 24 by a ball and socket joint as indicated at 38.

The other end of said spindle 24 is journalled in the bearing 17 formed or provided on the end of the gear box remote from the engine and has between that bearing and the screw-threaded portion 21 a squared portion 29.

This spindle 24 is operatively connected with the driven shaft 14 of the change-speed gear by variable transmission gear in the form of variable friction gear comprising two friction discs 30, 31, whereof the smaller 30 is slidable along but non-rotatable on the squared portion 29 of said spindle. The second, larger friction disc 31, lies adjacent to but at right angles to the smaller disc and is slidably carried on the squared outer end of a shaft 32 that is journalled at 33 in the side wall of the gear box and carries within the latter a bevel pinion 34 meshing with a bevel gear wheel 35 fast on the driven shaft 14 of the change-speed gear. The arrangement of these friction discs is such that the smaller disc can be traversed radially across the face of the larger one which can be moved towards and away from the smaller one in order to bring this variable transmission gear into and out of operation at will. For moving these discs they are provided in known manner each with a grooved hub with which a fork is shown in engagement.

Any convenient mechanism may be provided for adjusting the two friction discs so that the gear ratio of the same is equal to a desired gear ratio of the change-speed gear. For example, lever mechanism operatively connected with the larger disc may be operated by a cam or other member so operatively connected with the gear lever that when the gear is placed into neutral the two friction discs will be brought into engagement, whilst in other positions of the gear lever the discs will be out of engagement. For sliding the smaller disc a lever mounted for example on the dashboard of the vehicle and movable in a gate into various positions may be operatively connected with the smaller disc by lever mechanism and the fork engaging the hub of the disc.

Means such as a brake applied to the spindle of the differential mechanism may be provided for retarding the rotation of the spindle when the friction discs are out of engagement and thereby causing the spindle to move endwise in the nut into an end position. The one end position of the element 21 in the nut 20 is determined by the collar 25, and the second by a collar 36 at the other end of the element 21, in which end positions the engine throttle is respectively closed and fully open. The said second end position is indicated in broken lines at 125 and 128.

Assuming that the vehicle is travelling with the change-speed gear set at a given gear ratio and that it is desired to change to a different gear ratio, the friction discs 30, 31 are set to that desired gear ratio by shifting the smaller disc 30 along the squared portion 29 of the spindle 24, the clutch 11 is disengaged and the change-speed gear set into its neutral position. This action brings the friction discs 30, 31 into engagement; the clutch 11 is then engaged, locking the engine and driving shaft 13 of the gear box together. The differential mechanism then adjusts the throttle of the engine into such a position that the speed of the engine will correspond to that required for the desired gear ratio, when the clutch 11 can be disengaged momentarily for the purpose of setting the change-speed gear to the desired gear ratio by actuating the gear lever. As the engine is then running at the correct speed for the new gear ratio the change is effected readily and without any danger of injury to the wheels of the gear. The change of gear having been effected the friction discs are disengaged, and owing to the disc 30 being no longer driven by the disc 31 the inherent friction of the bearing 17 will cause the screw 21 to move through the nut 20 drawing back the rod 26 and allowing the throttle to return to whatever position the engine has been set to idle at.

It will be appreciated that the invention facilities changing from a higher gear to a facilitates changing from a higher gear to a necessitated a certain amount of skill on the part of the driver and has frequently been the cause of injury of the change-speed gear due to faulty operation.

Instead of either or both of the elements of the differential mechanism shown in the drawing being rotated continuously whilst they are being driven, they may be actuated intermittently, for example by means of pawl-and-ratchet mechanism operated mechanically, hydraulically or electrically, from the driving and driven shafts aforesaid respectively.

Any rotating part of the vehicle, such as the back wheel or front wheel axle can be used instead of the driven shaft of the change-speed gear for driving the one element of the differential mechanism.

Various modification may be made in the details of construction without departing from the scope of the invention.

I claim.

1. Power-transmission mechanism comprising the combination with an engine having a speed-control member, a change-speed gear driven by the engine, and a driven shaft driven by said gear, of a differential mechanism comprising two elements movable each relatively to the other, and operatively connected respectively with the engine and driven shafts of the change-speed gear, control means adjustable at will for adjusting the differential operation of said elements selectively to a ratio equal to a desired gear ratio of the change-speed gear, and adjusting means actuated by the differential operation of said elements and so arranged to operate said speed-control member as to adjust the engine speed relatively to the speed of the driven shaft so that their ratio shall be equal to the gear ratio to which the said control means is set.

2. Power-transmission mechanism comprising the combination with an engine having a speed-control member, a change-speed gear driven by the engine, and a driven shaft driven by said gear, of a differential mechanism comprising two elements movable each relatively to the other, two connecting means that operatively connect said elements respectively with the engine and driven shafts of the change-speed gear, one of which connecting means comprises variable transmission gear adjustable at will for adjusting the differential operation of said elements selectively to a ratio equal to a desired gear ratio of the change-speed gear, and adjusting means actuated by the differential operation of said elements and so arranged to operate said speed-control member as to adjust the engine speed relatively to the speed of the driven shaft so that their ratio shall be equal to the gear ratio to which the said control means is set.

3. Power-transmission mechanism comprising the combination with an engine having a speed-control member, a change-speed gear driven by the engine, and a driven shaft driven by said gear, of a differential mechanism comprising two elements movable each relatively to the other, and operatively connected respectively with the engine and driven shafts of the change-speed gear, control means comprising variable friction gear adjustable at will for adjusting the differential operation of said elements selectively to a ratio equal to a desired gear ratio of the change-speed gear, and adjusting means actuated by the differential operation of said elements and so arranged to operate said speed-control member as to adjust the engine speed relatively to the speed of the driven shaft so that their ratio shall be equal to the gear ratio to which the said control means is set.

4. Power-transmission mechanism comprising the combination with an engine having a speed-control member, a change-speed gear driven by the engine, and a driven shaft driven by said gear, of a differential mechanism comprising two elements screw-threaded one on the other, which elements are operatively connected respectively with the engine and driven shafts of the change-speed gear, control means adjustable at will for adjusting the differential operation of said elements selectively to a ratio equal to a desired gear ratio of the change-speed gear, and adjusting means actuated by the endwise movement of said second element and so arranged to operate said speed-control member as to adjust the engine speed relatively to the speed of the driven shaft so that their ratio shall be equal to the gear ratio to which the said control means is set.

5. Power-transmission mechanism comprising the combination with an engine having a speed-control member, a change-speed gear driven by the engine, and a driven shaft driven by said gear, of a differential mechanism comprising a nut element held against axial movement and arranged to be rotated by said engine shaft, and a spindle element screwed in said nut element, variable friction gear comprising two co-operating friction discs, whereof one is arranged to be rotated by the driven shaft of the change-speed gear, and the second can be traversed across the first and is arranged to rotate said spindle element, and a rod connecting the said spindle element with said speed-control member.

In testimony whereof I affix my signature.

HENRY MORAN.